2,933,518

NITRAMINO NITRILES AND PREPARATION THEREOF

Milton B. Frankel, Pasadena, and Karl Klager, Monrovia, Calif., assignors to Aerojet-General Corporation, Azusa, Calif., a corporation of Ohio No Drawing. Application June 9, 1955
Serial No. 514,385

15 Claims. (Cl. 260—465.5)

This invention relates to new compounds and a method for their preparation. In particular, it relates to nitramino nitriles having the general formula:

$$R-\underset{\underset{NO_2}{|}}{N}-A-CN$$

wherein R is an alkyl radical and A is an alkylene radical.

These compounds are excellent plasticizers for nitrocellulose and nitropolymers such as the polyurethane plastics, disclosed in assignee's copending application Serial No. 422,649, filed April 12, 1954, now abandoned. Commercial plasticizers used at the present time are non-explosive and hence detract from the explosive power of nitroploymers in which they are incorporated. The compounds of this invention, however, are not only plasticizers but also exhibit high explosive energy, as evidenced by their specific impulse.

The nitropolymers can be polymerized in the presence of a nitramino nitrile or the nitramino nitrile can be mixed into the nitropolymer after polymerization. The plasticizers of this invention are incorporated into the nitropolymer in amounts preferably from about 10% to about 40% by weight of the composition.

The nitraza nitriles of this invention are also useful as starting materials for the preparation of nitraza acids, as disclosed in our copending application Serial No. 514,386, filed concurrently with this application.

The nitramino nitriles of this invention are prepared by reacting an amino nitrile with nitric acid and subsequently dehydrating the resultant nitric acid salt, in accordance with the general reaction scheme set forth below:

$$R-NH-A-CN+HNO_3 \xrightarrow{HNO_3} R-NH-A-CN \xrightarrow{-H_2O} R-\underset{\underset{NO_2}{|}}{N}-A-CN$$

wherein R is an alkyl radical and A is an alkylene radical.

The reaction is preferably conducted at a temperature in the range of from about 0° C. to about 40° C. At lower temperatures, the reactions proceeds very slowly while at higher temperatures, the reaction is difficult to control. Increased smoothness of reaction is obtained when the amino nitrile is reacted with sufficient nitric acid to form the amine nitric acid salt. The remainder of the nitration is preferably conducted in the presence of an organic acid anhydride and halogen ion catalyst, such as Cl⁻, Br⁻, in accordance with the method disclosed by Wright, Canadian Journal of Research B, 26:114–137.

To more fully illustrate this invention, the following examples are presented. It should be understood, however, that these examples are presented merely as a means of illustration and are not intended to limit the scope of the invention in any way.

EXAMPLE I

*Preparation of 4-nitrazabutane-1-nitrile*

To a 5-liter flask, fitted with a stirrer, thermometer, and dropping funnel was charged 1485 gm. (16.5 mole) 70% nitric acid. The nitric acid was chilled to 0 to 5° C., and 1260 gm. (15 mole) 4-azavaleronitrile was added from the dropping funnel with vigorous stirring while the temperature was held at 0 to 5° C. by external cooling. The viscous slurry was filtered using a sintered glass Büchner funnel, and the colorless product was washed with ethyl ether. After pressing dry, the product, 4-nitrazabutane-1-nitrile nitrate, was transferred to a vacuum desiccator and dried over potassium hydroxide pellets until the last traces of solvent and moisture were removed. The yield of dry product was about 1200 gm. corresponding to a 54.4% yield, M.P. 70–71° C.

A 5-liter, 3-necked flask, fitted with a mechanical stirrer and thermometer, was charged with 840 ml. acetic anhydride. Keeping the temperature at 15–20° C., 13.8 ml. concentrated hydrochloric acid and 42 ml. technical 100% nitric acid were added successively. At 20–25° C., 735 gm. (5 mole) of the dry nitric acid salt of 4-azabutane-1-nitrile was added portionwise over about 30 minutes. After all of the salt had been added, the temperature was allowed to rise to 30° C., at which temperature the mixture became homogeneous. After stirring for an additional two hours, the solution was cooled to 5° C. and diluted with 2 liters of ice water. The oil was separated and the aqueous phase was extracted with three 600-ml. portions of methylene chloride. The combined oil and methylene chloride extracts were washed once with 300 ml. water and dried over sodium sulfate. The solvent was stripped with the water aspirator and the residual solvent removed by pumping out at 1–2 mm. on a warm water bath for 30–40 minutes. The yield was about 600 gm. (93.0%). Distillation gave a light yellow liquid, B.P. 60–70°/40 micron, $n_D^{25}=1.4863$. Elemental analysis of the product was as follows:

Calculated for $C_4H_7N_3O_2$: percent C, 37.21; percent H, 5.46; percent N, 32.54. Found: percent C, 37.13; percent H, 5.20; percent N, 32.76.

The product exhibited a specific impulse of 145 lb./sec.

Homologues of 4-nitrazabutane-1-nitrile are prepared in the identical manner using homologous azanitriles in place of 4-azabutane-1-nitrile. Thus, by nitrating nitriles such as 4-azapentane-1-nitrile and 3-azapropane-1-nitrile the corresponding nitraza compounds, namely 4-nitrazapentant-1-nitrile and 3-nitrazapropane-1-nitrile, are obtained. It will be appreciated by those skilled in the art that the novel method of this invention lends itself to the production of a wide variety of new and useful compounds.

The separation and purification of the nitrate salt can be omitted in the procedure of Example I and the desired nitraza compound prepared directly; however, it is preferred to conduct the reaction in two stages as in Example I.

We claim:

1. As new compositions of matter, nitramino nitriles having the general formula:

$$R-\underset{\underset{NO_2}{|}}{N}-A-CN$$

wherein R is a lower alkyl radical and A is a lower alkylene radical.

2. As a new composition of matter, 4-nitrazabutane-1-nitrile having the structural formula:

$$CH_3-\underset{\underset{NO_2}{|}}{N}-CH_2CH_2-CN$$

3. As a new composition of matter, 4-nitrazapentane-1-nitrile having the structural formula:

$$CH_3CH_2-\underset{\underset{NO_2}{|}}{N}-CH_2CH_2-CN$$

4. As a new composition of matter, 3-nitrazapropane-1-nitrile having the structural formula:

$$CH_3-\underset{\underset{NO_2}{|}}{N}-CH_2-CN$$

5. The method of preparing nitramino nitriles having the general formula:

$$R-\underset{\underset{NO_2}{|}}{N}-A-CN$$

which comprises reacting nitric acid with an amino nitrile having the general formula:

$$R-NH-A-CN$$

wherein R is a lower alkyl radical and A is a lower alkylene radical and subsequently dehydrating the resultant nitrate salt with an organic acid anhydride.

6. The method of claim 5 wherein the reaction is conducted at a temperature in the range of from about 15° to about 25° C.

7. The method of preparing 4-nitrazabutane-1-nitrile which comprises reacting 4-azabutane-1-nitrile with nitric acid and subsequently dehydrating the resultant nitrate salt with acetic anhydride.

8. The method of preparing 4-nitrazapentane-1-nitrile which comprises reacting 4-azapentane-1-nitrile with nitric acid and subsequently dehydrating the resultant nitrate salt with acetic anhydride.

9. The method of preparing 3-nitrazapropane-1-nitrile which comprises reacting 3-azapropane-1-nitrile with nitric acid and subsequently dehydrating the resultant nitrate salt with acetic anhydride.

10. The method of preparing nitramino nitriles having the general formula:

$$R-\underset{\underset{NO_2}{|}}{N}-A-CN$$

which comprises dehydrating a nitrate salt of a nitrile having the general formula:

$$R-NH-A-CN$$

with an organic acid anhydride wherein R is a lower alkyl radical and A is a lower alkylene radical.

11. The method of claim 10 wherein the dehydration is conducted in the presence of a halogen acid catalyst.

12. The method of claim 10 wherein the dehydration is conducted with acetic anhydride.

13. The method of claim 10 wherein the dehydration is conducted with acetic anhydride in the presence of hydrochloric acid.

14. The method of claim 10 wherein the dehydration is conducted with acetic anhydride in the presence of a mixture of hydrochloric acid and nitric acid.

15. The method of claim 10 wherein the dehydration is conducted in the presence of a halogen ion catalyst.

References Cited in the file of this patent

The Van Nostrand Chemist's Dictionary, D. Van Nostrand Co., Inc., New York (1953), pp. 208 and 218.